US 7,885,217 B2

(12) United States Patent
Iyer et al.

(10) Patent No.: US 7,885,217 B2
(45) Date of Patent: Feb. 8, 2011

(54) SYSTEM AND METHOD FOR EXTENDING BATTERY LIFE

(75) Inventors: Pradeep Iyer, Cupertino, CA (US); John Richard Taylor, Tiburon, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 469 days.

(21) Appl. No.: 11/728,255

(22) Filed: Mar. 22, 2007

(65) Prior Publication Data

US 2008/0232373 A1    Sep. 25, 2008

(51) Int. Cl.
G06C 17/00 (2006.01)
H04H 20/71 (2008.01)
H04J 3/24 (2006.01)
H04J 3/16 (2006.01)
H04B 1/16 (2006.01)

(52) U.S. Cl. ............... 370/311; 370/312; 370/349; 370/465; 455/343.1

(58) Field of Classification Search ............... 370/392, 370/252, 328, 329; 455/422.1, 553.1
See application file for complete search history.

(56) References Cited

U.S. PATENT DOCUMENTS

| 7,539,515 B2 | 5/2009 | Carlsson et al. |
| 2004/0043797 A1 | 3/2004 | Shostak |
| 2004/0141490 A1* | 7/2004 | Hong ............... 370/345 |
| 2005/0009512 A1* | 1/2005 | Rue ............... 455/420 |
| 2005/0009578 A1 | 1/2005 | Liu |
| 2005/0075084 A1* | 4/2005 | Salokannel et al. ..... 455/126 |
| 2006/0165031 A1* | 7/2006 | Wang et al. ............ 370/328 |
| 2007/0025734 A1* | 2/2007 | Oogushi et al. ......... 398/71 |
| 2007/0147328 A1 | 6/2007 | Carlsson et al. |
| 2007/0286209 A1* | 12/2007 | Wang et al. ......... 370/395.54 |
| 2008/0002692 A1* | 1/2008 | Meylan et al. ........... 370/390 |
| 2008/0112348 A1* | 5/2008 | Park et al. .............. 370/311 |
| 2008/0151814 A1* | 6/2008 | Jokela ................... 370/328 |

FOREIGN PATENT DOCUMENTS

WO   WO 2005 064815   7/2005

OTHER PUBLICATIONS

Sharma, Prem S., "White Paper: Is Your Network Ready for Mobile Voice? A Closer Look at Recent Technologies that Enable Pervasive Voice Over Wi-Fi", Jan. 2007, pp. 1-17, V2.0, Aruba Networks.

* cited by examiner

*Primary Examiner*—Alpus H Hsu
*Assistant Examiner*—Saad Hassan
(74) *Attorney, Agent, or Firm*—Blakely, Sokoloff, Taylor & Zafman LLP (57) ABSTRACT

According to one embodiment of the invention, a method comprises determining whether a non-unicast message is to be transmitted by a transmitting device, which may involve a setting a Delivery Traffic Indicator Map (DTIM) Interval value to reflect a longer periodicity than associated with a Listen Interval. After such determination, the non-unicast message may be converted into one or more unicast messages for transmission.

22 Claims, 5 Drawing Sheets

SYSTEM AND METHOD FOR EXTENDING BATTERY LIFE

FIELD

Embodiments of the invention relate to the field of communications, and in particular, to a system and method for battery power conservation by conversion of multicast transmissions over shared wireless media into unicast transmissions and alteration of the Delivery Traffic Indicator Map (DTIM) Interval value.

GENERAL BACKGROUND

Multicast and broadcast transmissions currently are treated the same in many wireless networks. To date, similar treatment of these transmission types has not posed any substantial problems since wireless is a broadcast medium by definition and anyone on the same frequency with the appropriate receiver can receive the signal, irrespective of the destination. However, similar treatment of these transmission types is spectrally inefficient and, in some cases, these non-unicast transmissions may have a detrimental effect on power usage by a wireless device.

As an example, an access point or base station (both generally referred to as "AP") has to make sure that a multicast transmission is sent at a modulation and coding rate that is acceptable to all wireless devices that are currently in communication with it. Therefore, for multicast transmissions, low (more robust and less efficient) transmission rates are commonly selected to accommodate each and every wireless device, even when a majority of the wireless devices can support significantly higher (less robust and more efficient) transmission rates.

Another disadvantage in supporting multicast transmissions for some wireless device is that, according to current IEEE 802.11 standards, there is no power-saving function to convert non-unicast (broadcast or multicast) transmissions to unicast transmissions while automatically adjusting the Delivery Traffic Indicator Map (DTIM). As a result, wireless devices may be required to "wake up" more often than needed to check for multicast or broadcast transmissions, which unnecessarily drains the battery of certain hand-held devices such as Voice-over-IP (VoIP) phones.

BRIEF DESCRIPTION OF THE DRAWINGS

The invention may best be understood by referring to the following description and accompanying drawings that are used to illustrate embodiments of the invention.

DETAILED DESCRIPTION

Embodiments of the invention relate to a system and method for battery power conservation by converting multicast transmissions over shared wireless media into unicast transmissions. Such conversion may be confined to a particular type of device in order to reduce power consumption (e.g., battery-powered devices, networked telephones, etc.). In order to achieve battery power conservation, the Delivery Traffic Indicator Map (DTIM) Interval value, namely a representation of the time period between successive checks by a wireless device for buffered non-unicast data on the AP, is increased. In certain situations, the DTIM Interval value is increased so that this time period is longer than the time period for the Listening Interval. The "Listening Interval" is a representation of the time period between successive checks by wireless device for unicast messages.

Certain details are set forth below in order to provide a thorough understanding of various embodiments of the invention, albeit the invention may be practiced through many embodiments other than those illustrated. Well-known logic and operations are not set forth in detail in order to avoid unnecessarily obscuring this description.

In the following description, certain terminology is used to describe features of the invention. For example, "software" is generally considered to be executable code such as an application, an applet, a routine or even one or more executable instructions stored in a storage medium. Firmware is considered merely one type of software. The "storage medium" may include, but is not limited or restricted to a programmable electronic circuit, a semiconductor memory device inclusive of volatile memory (e.g., random access memory, etc.) and non-volatile memory (e.g., programmable and non-programmable read-only memory, flash memory, etc.), a hard drive, a portable memory device (e.g., floppy diskette, a compact disk "CD", digital versatile disc "DVD", a digital tape, a Universal Serial Bus "USB" flash drive), or any medium that is deemed statutory by a court of law.

A "receiving device" is an electronic device that is configured to receive wireless messages. For instance, the receiving device may be adapted to request membership to a multicast group within a network. An example of a receiving device include a "station" (STA), which is any wireless device such as a wireless device that contains an IEEE 802.11 conformant medium access control (MAC) and physical layer (PHY) interface to a wireless interconnect medium. Another example of a receiving device is an access point or base station (AP) when deployed within a wireless mesh network.

A "transmitting device" is a device that is configured to transmit a wireless message. For instance, as an example, the transmitting device may be adapted to participate in the granting or denial of membership to a multicast group in response to a request by a receiving device. An example of a transmitting device includes, but is not limited or restricted to an AP, which is generally considered to be any entity that has station functionality and provides access to distributed services via the wireless medium for associated STAs. Another example of a transmitting device is a wireless network switch that controls multicast grouping in a centralized location.

A "message" is information arranged in a predetermined format that is transmitted over a point-to-point or shared media, namely a wired or wireless pathway for information. One type of message is a "multicast message" that includes information either involved in the formulation of a transmission path for multicast data to one or more receiving devices belonging to a particular group or involved in multicast transmissions. The multicast message may be a separate message or may be part of other message such as a beacon, probe request/response, association request/response, or the like.

I. First Embodiment of the Power Conservation Mechanism

Figure 1:
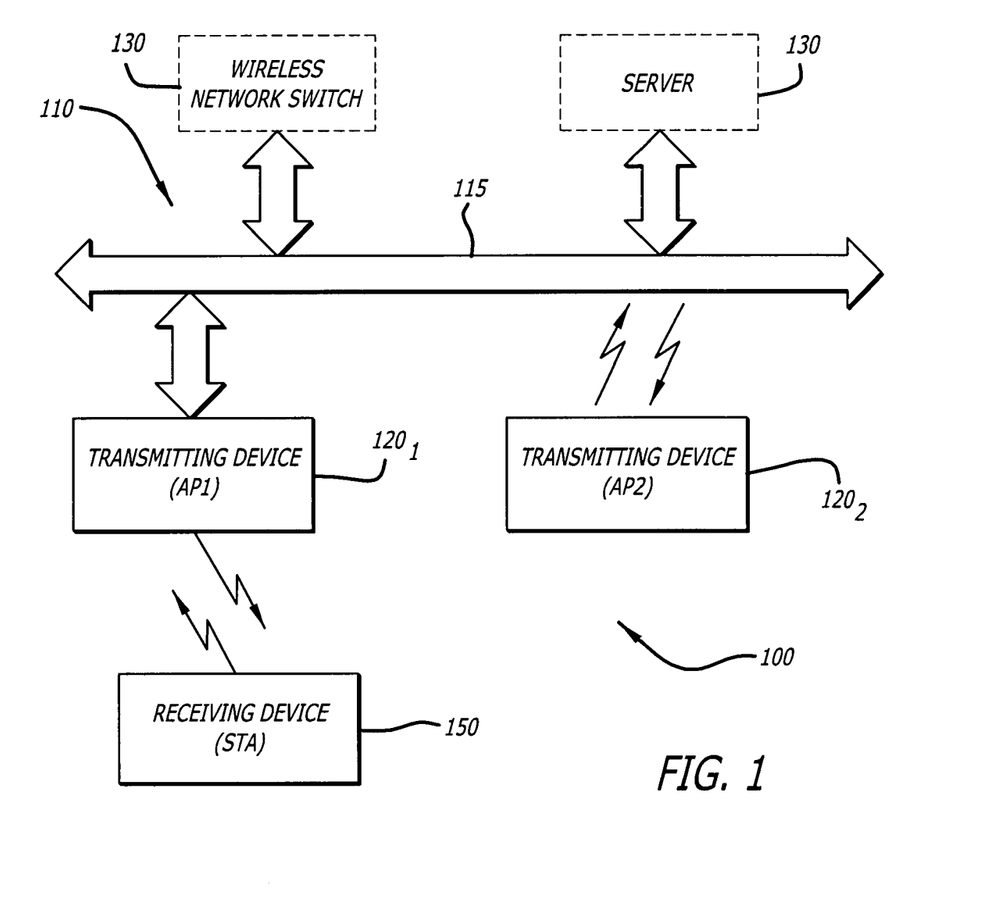
FIG. 1 is an exemplary embodiment of a wireless network support a power conservation mechanism.

Referring to FIG. 1, an exemplary embodiment of a wireless network 100 supports a power conservation mechanism is shown. In accordance with one embodiment of the invention, wireless network 100 may be implemented as a wireless local area network (WLAN) including a wired network 110 operating as an Open Source Interconnect (OSI) Layer 2/Layer 3 (L2/L3) network. Wired network 110 supports communications between a plurality of transmitting devices $120_1$-$120_N$ ($N \geq 2$), such as access point (AP) $120_1$ and AP $120_2$ for example, and wired resources 130 communicatively coupled to a wired interconnect medium 115. Examples of resources 130 may include, but are not limited or restricted to servers or a wireless network switch since the power-saving techniques described below can be centralized in lieu of being implemented on independent APs.

Of course, it is contemplated that a mesh or another wireless network may be substituted for wired network 115 of FIG. 1. Hence, transmitting devices $120_1$-$120_N$ may be in communication with each other over wireless connections. Moreover, certain transmitting devices (e.g., AP $120_2$) may be able to operate as a receiving device and participate as part of a multicast group.

As shown, transmitting device $120_1$ is adapted to provide wireless communications with one or more receiving devices 150. According to one embodiment of the invention, an AP is deployed as transmitting device $120_1$ while receiving device 150 is a wireless station (STA) powered by a rechargeable power source (e.g., portable computer, personal digital assistant "PDA", Voice-over-IP "VoIP" telephone, etc.). While the illustrative embodiments describe the communications between an AP and STA, it is contemplated that the claimed invention generally involves communications between two or more devices with wireless communication capabilities.

Figure 2:
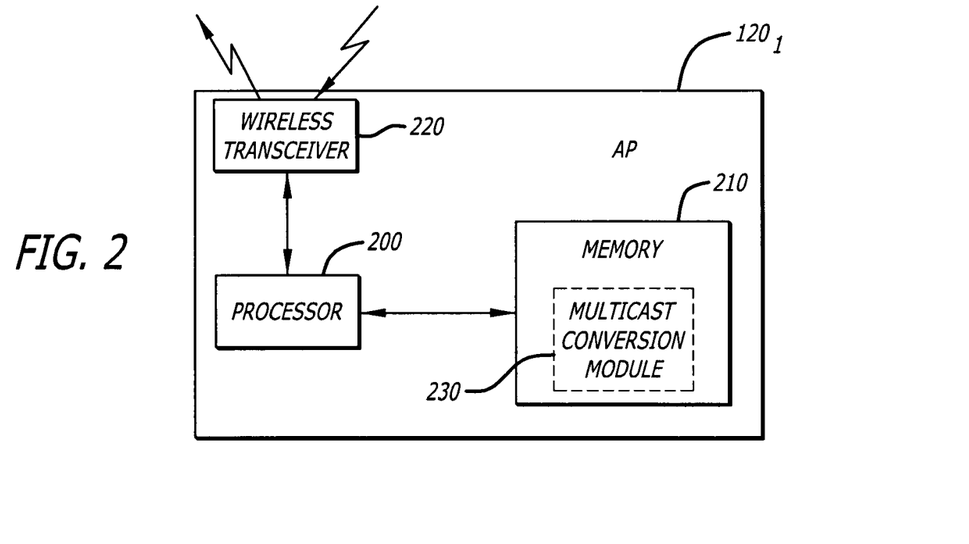
FIG. 2 is an exemplary embodiment of a multicast transmitting device, namely an access point (AP).

Referring to FIG. 2, an exemplary embodiment of AP $120_1$ is shown. According to one embodiment of the invention, AP $120_1$ comprises a processor 200, memory 210 and a wireless transceiver 220. More specifically, wireless transceiver 220 operates as the interface for AP $120_1$ and is controlled to receive or transmit messages as well as format assembly and/or disassembly of the messages as needed.

Processor 200 is a component that is responsible for generating outgoing multicast and unicast messages and for recovering information from incoming messages. For instance, processor 200 may be adapted to execute a non-unicast (e.g., multicast) conversion module 230 in order to convert an outgoing multicast message into one or more unicast messages. Module 230 may be software stored in memory 210 or may be stored as firmware or hard wired into AP $120_1$. Examples of various types of components forming processor 200 include, but are not limited or restricted to a microprocessor, application specific integrated circuit, programmable gate array, a digital signal processor, a microcontroller and the like.

For a system as shown in FIGS. 1 and 2, according to one embodiment of the invention, power conservation may be achieved by placing a transmitting device, such as AP $120_1$ for example, into a particular power-saving mode (hereinafter referred to as the "battery-boost" mode"). When placed in battery-boost mode, AP $120_1$ is adapted to (i) execute non-unicast (e.g., multicast) conversion module 230 so as to convert outgoing multicast traffic to unicast traffic, and (ii) alter the Dynamic Traffic Indicator Map (DTIM) Interval value so as to cause a receiving device, such as STA 150 for example, to wake-up less often than when in normal operating mode. According to one embodiment of the invention, the adjustment of the DTIM Interval value above the Listening Interval, namely a multiple of the beacon interval that controls wake-up of the receiving device for unicast traffic, provides an effective power-saving mechanism.

A. Multicast-To-Unicast Conversion

Figure 3A:
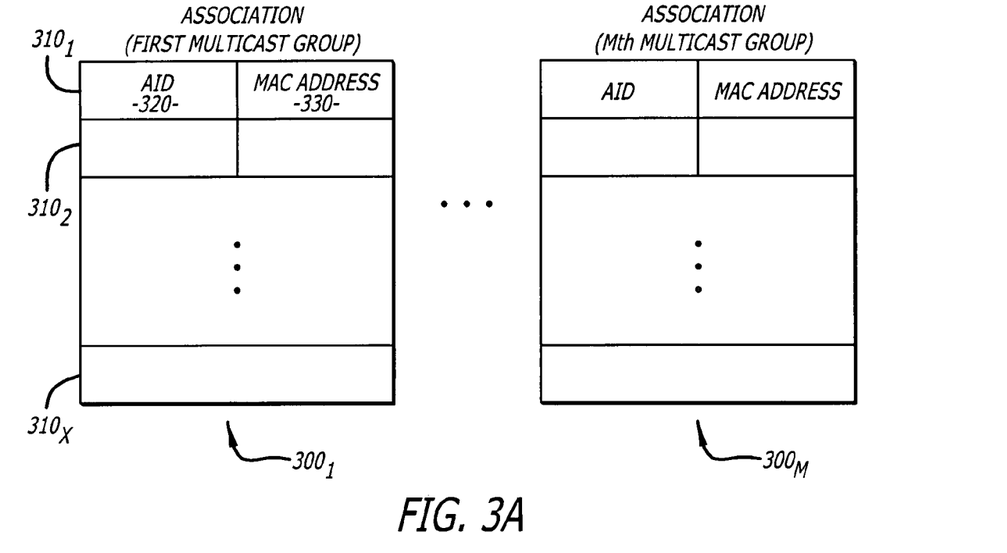
FIG. 3A is a first exemplary embodiment of a table-based architecture for a power conservation mechanism implemented with the transmitting device.

In order to convert multicast traffic to unicast traffic, AP $120_1$ (or external storage accessible by AP $120_1$) maintains an association table $300_1$-$300_M$ ($M \geq 1$) for each of the "M" multicast group(s). As shown in FIG. 3A, association table $300_1$ includes a plurality of entries $310_1$-$310_x$, where $x \geq 1$. Each of these entries includes at least two corresponding fields 320 and 330. A first field 320 includes an association identifier (hereinafter referred to as the "AID"), which is a unique number that identifies an association between AP $120_1$ and a particular receiving device (e.g., STA 150). A second field 330 includes a Media Access Control (MAC) address of STA 150 (hereinafter referred to as the "MAC address")

Figure 3B:
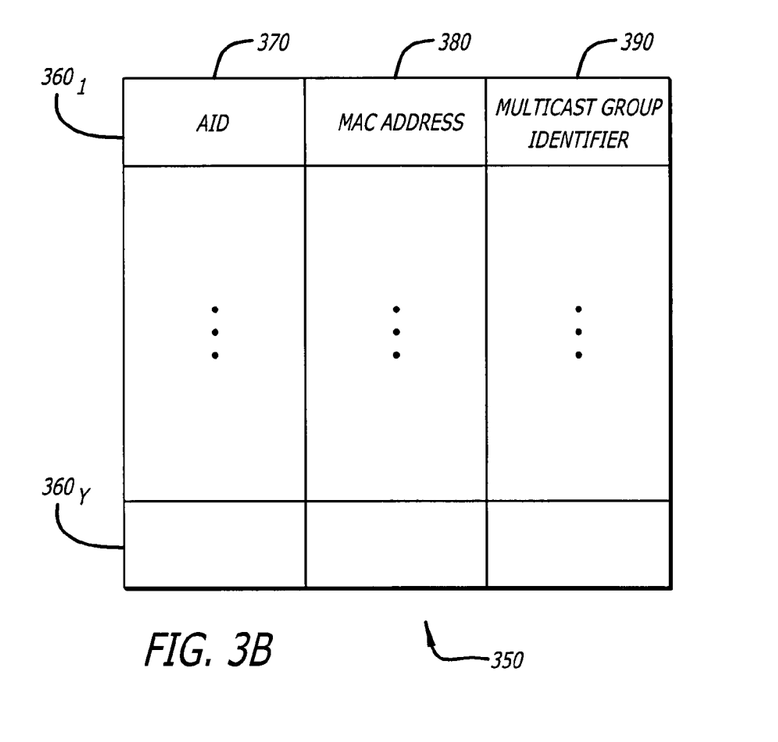
FIG. 3B is a second exemplary embodiment of a table-based architecture for a power conservation mechanism implemented with the transmitting device.

Alternatively, as shown in FIG. 3B, it is contemplated that AP $120_1$ (or external storage accessible by AP $120_1$) may feature a single association table 350 that identifies all of the devices that AP $120_1$ is associated with. As shown in FIG. 3B, association table 350 includes a plurality of entries $360_1$-$360_y$, where $y \geq 1$. Each of these entries $360_1$-$360_y$ includes an AID 370 and MAC address 380 for the particular receiving device (e.g., STA 150) associated with AP $120_1$. Moreover, each entry $360_1$, . . . , or $360_y$ further includes a multicast group identifier 390 to identify whether STA 150 belongs to a multicast group, and if so, which multicast group.

According to one embodiment of the invention, the multicast-to-unicast conversion may be accomplished by simply generating a copy of the multicast message for each multicast group member, namely "3" copies for a first multicast group as illustrated in association table $300_1$ of FIG. 3A or association table 350 of FIG. 3B. Then, for each copied message, the multicast address within the header is substituted with the corresponding MAC address contained in the entry for the multicast group member(s). Thus, as shown, three (3) unicast messages are generated from the multicast message. These unicast messages may also experience transmission rate adjustments, if such information is available to logic within the transmitting device.

B. Altering the DTIM Internal Value

As described above, "DTIM" is a countdown mechanism that informs clients, such as STA 150 of FIG. 1 for example, when to listen to broadcast or multicast messages. Similar to the DTIM Interval value, the "Listening Interval" is a mechanism that determines when the receiving device is to wake-up and listen for unicast messages. So, according to one embodiment of the invention, when AP $120_1$ is placed in the battery-boost mode, the DTIM Interval value is substantially increased, and according to this embodiment, is increased above the Listening Interval.

For example, during normal operating mode, the AP $120_1$ has the DTIM Interval value set to a first predetermined value. During battery-boost mode, however, the AP $120_1$ has the DTIM Interval value set to a second predetermined value that is larger than the first predetermined value. As an example, setting the DTIM Interval value to "5" represents that STA 150 is requesting a DTIM interval extending five broadcast beacon cycles (e.g., some multiple longer than the default time period between broadcast DTIM messages in normal operating mode). Where the Listening Interval is set to "10" denoting 10 beacon cycles before AP $120_1$ checks for unicast messages, by setting the DTIM Interval value to "100," STA 150 is provided with a more aggressive power-save feature where the STA 150 will generally wake-up for receipt of unicast messages every 10 beacon cycles, but will only awaken from sleep mode for multicast messages after 100 beacon cycles.

Figure 4:
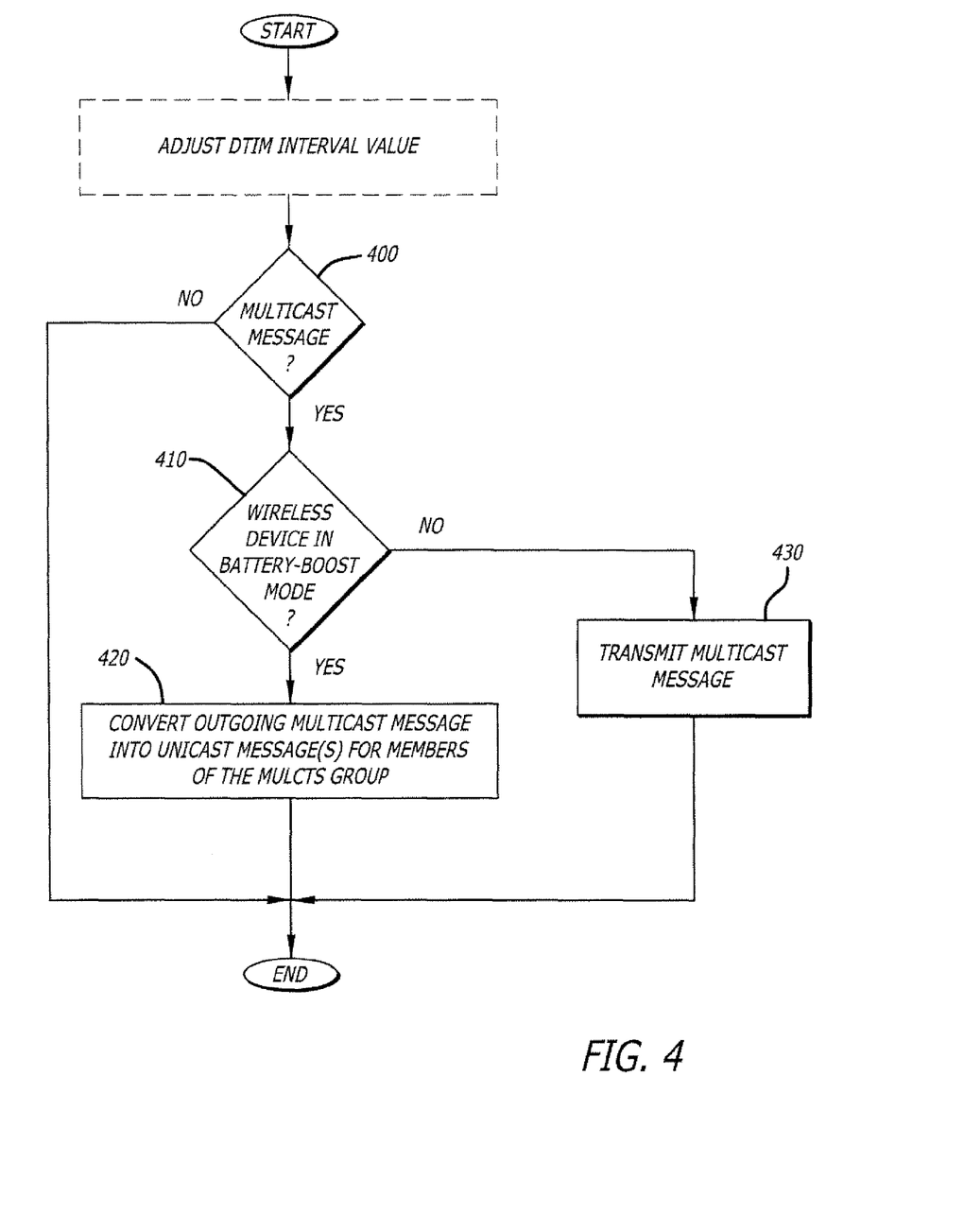
FIG. 4 is an exemplary flowchart of the operations performed by a transmitting device.

Referring now to FIG. 4, an exemplary flowchart of the operations performed by a transmitting device is shown. Prior to transmission of a multicast message and after adjustment of the DTIM during configuration, the transmitting device determines whether it is operating in the battery-boost mode (blocks 400 and 410). If the battery-boost mode is enabled, the transmitting device is adapted to convert an outgoing multicast message into one or more unicast messages, namely unicast message(s) for each wireless device being a member of the multicast group corresponding to the multicast message (block 420). Otherwise, if battery-boost mode is disabled, the transmitting device simply transmits the multicast message as normal (block 430).

II. Second Embodiment of the Power Conservation Mechanism

Figure 5:
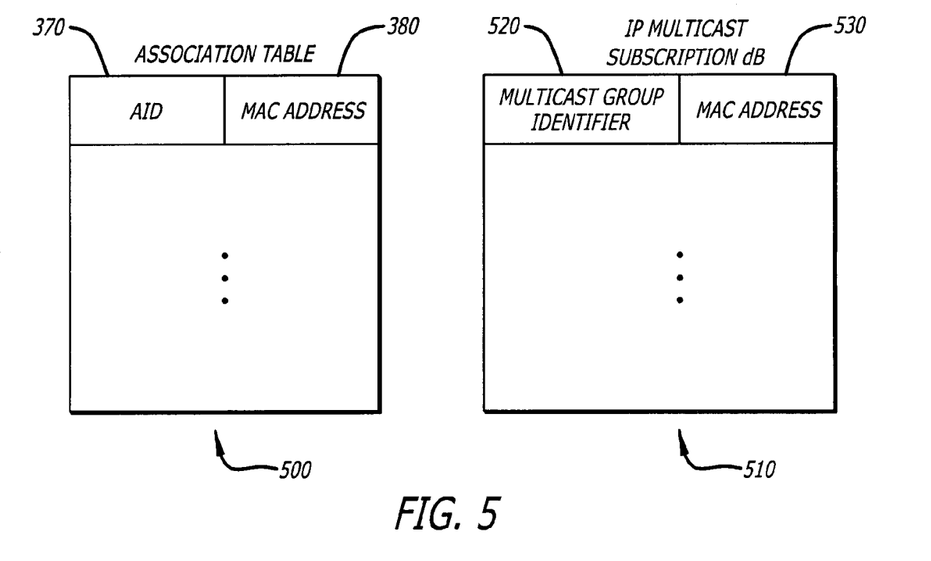
FIG. 5 is a second embodiment of the power conservation mechanism.

Referring now to FIG. 5, a second embodiment of the power conservation mechanism is shown. Herein, multicast-to-unicast replication can be filtered based on IP Multicast subscription database that is created in AP $120_1$ by an Internet Group Management Protocol (IGMP) snooping function. More specifically, AP $120_1$ (or external storage accessible by AP $120_1$) maintains both (i) an association table 500 that identifies all of the devices that are associated with AP $120_1$ and (ii) an IP Multicast subscription database 510.

As shown, IP Multicast subscription database 510 is formed by monitoring IGMP JOIN messages by STAs, and storing both a Multicast Group identifier 520 and a MAC address 530 of each STA issuing an IGMP JOIN message. Thereafter, if operating in the Battery-Boost mode and before transmitting a multicast message, AP $120_1$ determines if each MAC address for the particular multicast group (identified by the Multicast Group identifier) is found in association table 500 (e.g., MAC address 380). If so, AP $120_1$ converts the multicast message to one or more unicast messages as described above and transmits the unicast message(s) only to the MAC addresses corresponding to devices still associated with AP $120_1$, namely in the association table. Otherwise, AP $120_1$ transmits the multicast message as normal.

III. Third Embodiment of the Power Conservation Mechanism

Figure 6:
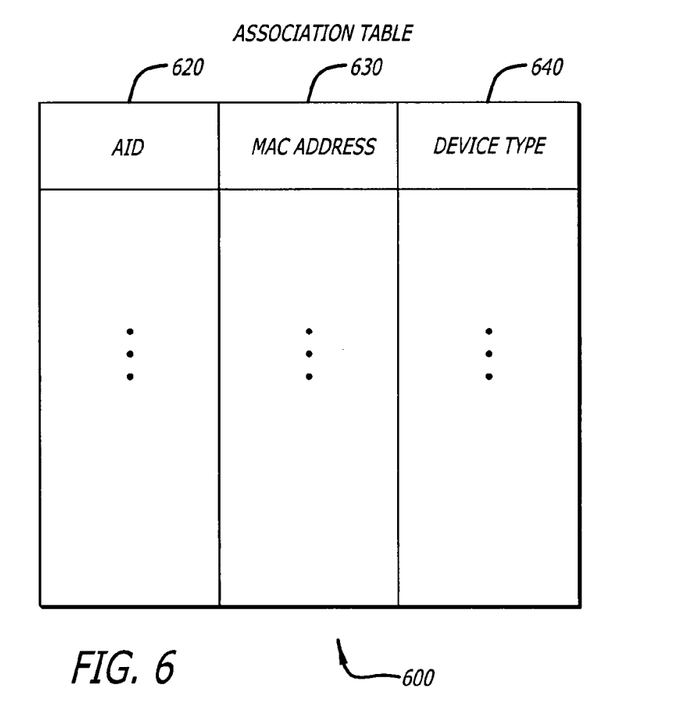
FIG. 6 is a third embodiment of the power conservation mechanism.

Referring now to FIG. 6, a third embodiment of the power conservation mechanism is shown. Herein, in order to convert non-unicast (multicast and/or broadcast) traffic to unicast traffic, AP $120_1$ (or external storage accessible by AP $120_1$) maintains an association table 600 that identifies all of the devices that AP $120_1$ is associated with. As shown in FIG. 6, association table 600 includes a plurality of entries $610_1$-$610_z$, where $z \geq 1$. Each of these entries includes at least three corresponding fields 620, 630 and 640. A first field 620 includes an association identifier (AID) while a second field 630 includes a Media Access Control (MAC) address of the particular receiving device associated with the AP $120_1$. An optional third field 640 includes a code to identify the device type of the receiving device. The receiving device may provide the "device type" information during or after the association process.

Figure 7:
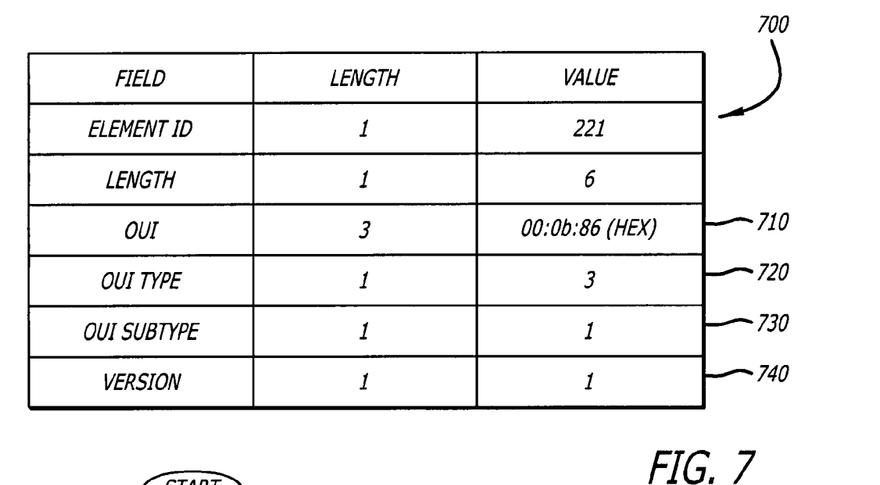
FIG. 7 is an exemplary embodiment of a vendor specific extension element of a Beacon or Probe Response message.

For instance, according to one embodiment of the invention, AP $120_1$ may advertise battery-boost capability in a Beacon or Probe Response frame. Such capability may be captured within a vendor specific extension element 700 (element ID 221) of the Beacon or Probe Response messages as shown in FIG. 7. Three octets within this information element represent the Organizationally Unique Identifier (OUI) 710. IEEE assigns a unique OUI for each vendor. The next octet is the OUI type identifier 720, which identifies that this basic service set, namely AP $120_1$, supports battery-boost. The OUI subtype and version fields 730 and 740 are used so that future implementation of the protocol can be extended. The advertisement capability is used by clients (receiving devices) to disable DTIM processing and to set appropriate value for the Listen Interval. Receiving devices can also advertise battery-boost support by sending the same element ID in an Association Request frame.

According to one embodiment of the invention, the non-unicast-to-unicast conversion may be accomplished by generating a copy of the non-unicast message for each entry associated with a device type that is assigned to utilize battery-boost power savings. As an illustration, VoIP phones may be selected as one type of device that utilizes battery-boost functionality. Hence, non-unicast messages directed to a VoIP phone is converted to a unicast message for routing to the VoIP phone as a unicast message.

Figure 8:
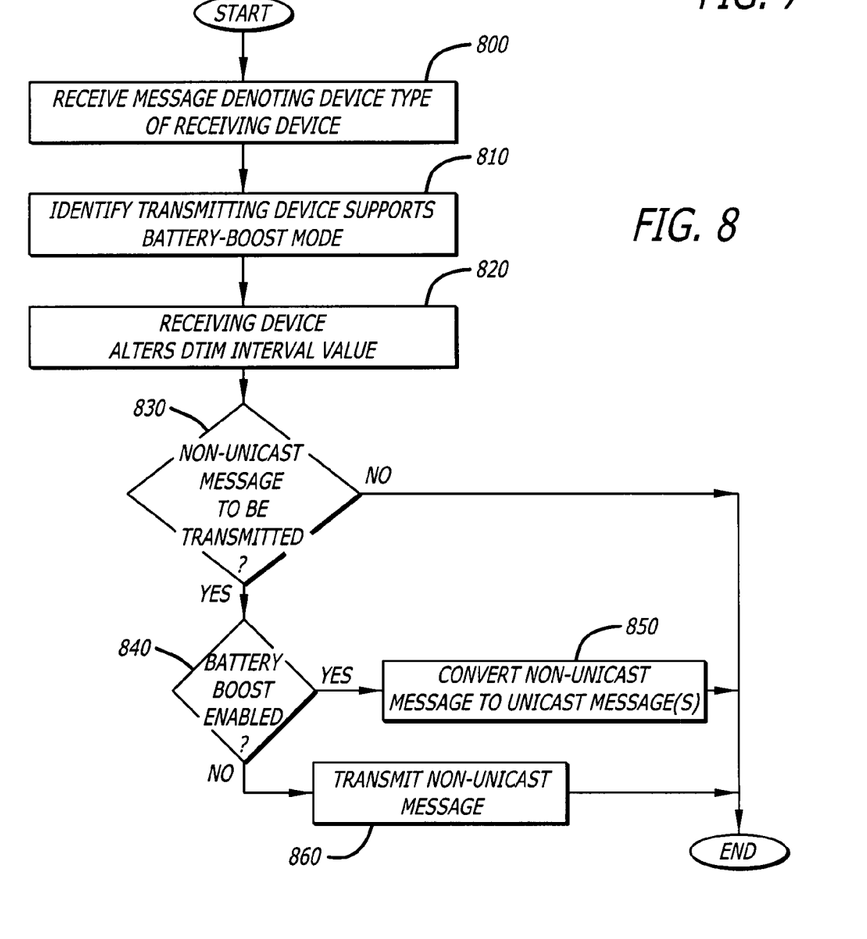
FIG. 8 is an exemplary flowchart of the operations performed by a transmitting device utilizing the association table of FIG. 6.

Referring now to FIG. 8, an exemplary flowchart of the operations performed by a transmitting device utilizing the association table of FIG. 6 is shown. Prior to transmission of a non-unicast message, the transmitting device receives a message including device type identification information from the receiving device (block 800). Thereafter, transmitting device transmits a message that identifies that it is operating in the battery-boost mode (block 810). The receipt of this message causes the receiving device to alter its DTIM Interval value in order to substantially increase the time period between wake-up operations by the receiving device in order to check for multicast transmissions (block 820). If the battery-boost mode is enabled, the transmitting device converts an outgoing non-unicast message into one or more unicast messages, namely unicast message(s) for each wireless device denoted in the association table as being a particular device type with power-savings (blocks 830, 840 and 850). Otherwise, if battery-boost mode is disabled, the transmitting device simply transmits the non-unicast message as normal (block 860).

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. A method comprising:
   determining by a wireless device whether a non-unicast message is to be transmitted by the wireless device by checking a Delivery Traffic Indicator Map (DTIM) Interval and a Listening Interval, the DTIM Interval representing a time period between successive checks by a wireless receiving device for non-unicast messages and the Listening interval representing a time period between successive checks by the wireless receiving device for unicast messages; and converting the non-unicast message into one or more unicast messages for transmission upon determining that the DTIM Interval is greater than the Listening Interval while the wireless device maintains an ability to check for and receive non-unicast messages in accordance with the DTIM Interval, wherein the DTIM Interval is set to be greater than the Listening Interval so that the wireless receiving device is checking for unicast messages more frequently than non-unicast messages.

2. The method of claim 1, wherein the non-unicast message is a multicast message.

3. The method of claim 1 further comprises setting the DTIM Interval to be greater than the Listening Interval by setting a DTIM Interval value to be greater than a value representing the Listening Interval.

4. The method of claim 1, wherein the converting of the unicast message includes conversion of all non-unicast messages to be transmitted by the transmitting device after comparing the DTIM Interval value and the value representing the Listening Interval.

5. The method of claim 1, wherein the Listening interval being a multiple of a beacon interval that controls wake-up of the receiving device for unicast traffic.

6. The method of claim 1, wherein prior to the wireless device determining whether the non-unicast message is to be transmitted, the method further comprises advertising a battery-boost mode capability by placement of information within an information element of a transmitted message, the battery-boost mode indicates that the wireless device is adapted to convert non-unicast traffic into unicast traffic for transmission and increase the DTIM interval.

7. The method of claim 6, wherein the data includes an Organizationally Unique Identifier (OUI) including one or more bits to identify that the transmitting device supports the battery-boost mode.

8. The method of claim 2, wherein determining whether the multicast message is to be transmitted includes determining if medium access control (MAC) addresses for a particular multicast group identified by a Multicast Group identifier are found in an association table stored in the wireless device and the DTIM Interval is less than the Listening Interval.

9. The method of claim 8, wherein the converting of the multicast message into one or more unicast messages includes converting the multicast message into unicast frames each uniquely addressed with a MAC address contained in the association table directed to a device that is also a member of the particular multicast group.

10. The method of claim 1 further comprising transmitting the non-unicast message from the wireless device upon determining that the DTIM Interval is not greater than the Listening Interval.

11. A non-transitory computer readable storage medium embodying software that is executed by hardware logic implemented within a transmitting device that is adapted to transmit messages to a receiving device, comprising:

a first software module that, when executed by the hardware logic within the transmitting device, determines whether a non-unicast message is to be transmitted from the transmitting device by checking a Delivery Traffic Indicator Map (DTIM) Interval and a Listening Interval, the DTIM Interval representing a time period between successive checks by the receiving device for non-unicast messages-and the Listening interval representing a time period between successive checks by the receiving device for unicast messages; and a second software module that, when executed by the hardware logic within the transmitting device, converts the non-unicast message into one or more unicast messages for transmission so as to (i) achieve reduced power consumption by increasing an amount of time between wake-up events for receipt of non-unicast messages when the DTIM Interval is greater than the Listening Interval and (ii) maintain an ability to check for and receive non-unicast messages in accordance with the DTIM Interval.

12. The computer readable storage medium of claim 11, wherein the second software module to convert all non-unicast messages to unicast messages to be transmitted by the transmitting device provided a DTIM Interval value representing the DTIM Interval is greater than a value representing the Listening Interval.

13. The computer readable storage medium of claim 12 further comprising a third software module to set a DTIM Interval value representing the DTIM Interval to be greater in value than a value representing the Listening interval being multiple beacon cycles.

14. The computer readable storage medium of claim 11, wherein the non-unicast message is a multicast message.

15. The computer readable storage medium of claim 11 further comprising a third software module to analyze data within a predetermined information element to determine if the transmitting device supports a battery-boost mode, the battery-boost mode indicates that the wireless device is adapted to (i) convert non-unicast traffic into unicast traffic for transmission and (ii) increase the DTIM interval.

16. The computer readable storage medium of claim 14, wherein the first software module to determine if medium access control (MAC) addresses for a particular multicast group identified by a Multicast Group identifier are found in an association table stored in the transmitting device.

17. The computer readable storage medium of claim 16, wherein the second software module to convert the multicast message into unicast frames each uniquely addressed with a medium access control (MAC) address contained in the association table directed to a device that is also a member of the particular multicast group.

18. A wireless device of a network, comprising:

a memory; and a processor coupled to the memory, the processor to determine whether a non-unicast message is to be transmitted and to convert the non-unicast message into one or more unicast messages for transmission upon determining that a Delivery Traffic Indicator Map (DTIM) Interval, representing a time period between successive checks by a wireless receiving device of the network for non-unicast data, represents a longer periodicity than a Listening Interval, the Listening Interval being a representation of a time period between successive checks by the wireless receiving device for unicast data, wherein the DTIM Interval is set to be greater than the Listening Interval so that the wireless receiving device is checking for unicast messages more frequently than non-unicast messages while maintaining an ability to check for and receive non-unicast messages in accordance with the DTIM Interval.

19. The wireless device of claim 18, wherein the processor determining that the DTIM Interval represents a longer periodicity than the Listening Interval by determining that a DTIM Interval value is greater than a value representing the Listening Interval, the DTIM Interval value identifies a number of beacon cycles for the DTIM Interval.

20. The wireless device of claim 18 being an access point.

21. A method comprising:
   receiving a non-unicast message by a wireless device;
   checking a Delivery Traffic Indicator Map (DTIM) Interval and a Listening Interval by the wireless device, the DTIM Interval representing a time period between successive checks by a wireless receiving device for non-unicast messages and the Listening Interval representing a time period between successive checks by the wireless receiving device for unicast messages;
   converting the non-unicast message into one or more unicast messages for transmission from the wireless device if the DTIM Interval is greater than the Listening Interval while the wireless device maintains an ability to check for and receive non-unicast messages in accordance with the DTIM Interval; and
   transmitting the non-unicast message by the wireless device if the DTIM Interval is not greater than the Listening Interval,
   wherein the DTIM Interval is set to be greater than the Listening Interval.

22. The method of claim 21 wherein the wireless device is an access point.

* * * * *